（12） United States Patent
Seropian et al.

(10) Patent No.: US 10,974,149 B2
(45) Date of Patent: Apr. 13, 2021

(54) CONTROLLING CHARACTER MOVEMENT IN A VIDEO-GAME

(71) Applicant: Electronic Arts Inc., Redwood City, CA (US)

(72) Inventors: Alexander Seropian, La Canada, CA (US); Scott Cameron, Pasadena, CA (US); Timothy Michaels, Long Beach, CA (US); Sean Michael Kearney, West Hills, CA (US); Jason T. Pecho, Pasadena, CA (US); Justin Taber, Glendale, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/254,046

(22) Filed: Jan. 22, 2019

(65) Prior Publication Data

US 2020/0289933 A1 Sep. 17, 2020

(51) Int. Cl.

| | |
|---|---|
| A63F 13/55 | (2014.01) |
| A63F 13/525 | (2014.01) |
| G06F 3/0481 | (2013.01) |
| A63F 13/23 | (2014.01) |
| G06F 3/0484 | (2013.01) |
| A63F 13/5375 | (2014.01) |
| A63F 13/537 | (2014.01) |
| A63F 13/5372 | (2014.01) |

(52) U.S. Cl.
CPC .............. *A63F 13/55* (2014.09); *A63F 13/23* (2014.09); *A63F 13/525* (2014.09); *A63F 13/537* (2014.09); *A63F 13/5372* (2014.09); *A63F 13/5375* (2014.09); *G06F 3/0484* (2013.01); *G06F 3/04815* (2013.01); *G06F 3/04817* (2013.01)

(58) Field of Classification Search
CPC .... A63F 13/525; A63F 13/5255; A63F 13/53; A63F 13/537; A63F 13/5372; A63F 13/5375; A63F 13/55; A63F 13/23
See application file for complete search history.

(56) References Cited

U.S. PATENT DOCUMENTS

| | | | |
|---|---|---|---|
| 6,273,818 B1* | 8/2001 | Komoto | A63F 13/005 463/31 |
| 6,280,323 B1* | 8/2001 | Yamazaki | A63F 13/005 463/4 |
| 6,821,206 B1* | 11/2004 | Ishida | A63F 13/10 463/43 |

(Continued)

*Primary Examiner* — Jasson H Yoo
(74) *Attorney, Agent, or Firm* — McDermott Will & Emery LLP

(57) ABSTRACT

Various aspects of the subject technology relate to systems, methods, and machine-readable media for controlling movement in a video game. The method includes rotating a camera angle in a virtual world to change a viewpoint of a character. The method also includes populating a movement control interface with selections corresponding to points of interest in the virtual world in response to rotating the camera angle, the selections changing based on the viewpoint. The method also includes selecting a point of interest from the movement control interface by toggling a selection corresponding to the point of interest. The method also includes moving the character to the point of interest in the virtual world.

20 Claims, 3 Drawing Sheets

(56) References Cited

U.S. PATENT DOCUMENTS

| | | | | |
|---|---|---|---|---|
| 7,708,641 | B2* | 5/2010 | Tawara | A63F 13/10 463/31 |
| 7,713,126 | B2* | 5/2010 | Suzuki | A63F 13/10 463/31 |
| 7,922,584 | B2* | 4/2011 | Egashira | A63F 13/10 463/38 |
| 9,349,201 | B1* | 5/2016 | Gault | A63F 13/22 |
| 10,118,098 | B2* | 11/2018 | Kumagai | A63F 13/525 |
| 10,478,730 | B1* | 11/2019 | Burnett | A63F 13/20 |
| 2002/0103031 | A1* | 8/2002 | Neveu | A63F 13/06 463/49 |
| 2005/0176502 | A1* | 8/2005 | Nishimura | A63F 13/10 463/31 |
| 2007/0270215 | A1* | 11/2007 | Miyamoto | A63F 13/10 463/32 |
| 2008/0215981 | A1* | 9/2008 | York | A63F 13/00 715/720 |
| 2008/0261696 | A1* | 10/2008 | Yamazaki | A63F 13/06 463/39 |
| 2010/0265173 | A1* | 10/2010 | Matsunaga | G06F 3/0334 345/157 |
| 2010/0302238 | A1* | 12/2010 | Yonemori | A63F 13/10 345/419 |
| 2010/0304814 | A1* | 12/2010 | Coleman | A63F 13/822 463/9 |
| 2011/0250966 | A1* | 10/2011 | Ohara | A63F 13/5375 463/36 |
| 2012/0196678 | A1* | 8/2012 | Fujisawa | A63F 13/25 463/33 |

* cited by examiner

CONTROLLING CHARACTER MOVEMENT IN A VIDEO-GAME

TECHNICAL FIELD

The present disclosure generally relates to video games, and more particularly to controlling character movement in a video game.

BACKGROUND

Conventional techniques for controlling movement in a video game involve the use of a controller. First person shooter games typically include separate controls for controlling a camera view and movement of a player. Because a player often actively engages both controls simultaneously with both thumbs, it becomes difficult to perform other tasks involving the player's thumbs. As a result, the player must tradeoff controlling camera view and/or movement for performing other in-game tasks. This affects the player's ability to play the game, and reduces the player's enjoyment of playing the game. Therefore, it is desirable to have improved controls for movement in a video game.

SUMMARY

The subject disclosure provides for an improved video game playing experience by automatically controlling movement of a video game character to a point of interest. A movement control interface is populated with points of interest based on a camera view of a player. As the player controls the camera view, the movement control interface updates the points of interest. By toggling any point of interest, the video game character automatically travels to that point of interest, thus freeing up the player's hands for other in-game tasks.

According to one embodiment of the present disclosure, a computer-implemented method for controlling movement in a video game is provided. The method includes rotating a camera angle in a virtual world to change a viewpoint of a character. The method also includes populating a movement control interface with selections corresponding to points of interest in the virtual world in response to rotating the camera angle, the selections changing based on the viewpoint. The method also includes selecting a point of interest from the movement control interface by toggling a selection corresponding to the point of interest. The method also includes moving the character to the point of interest in the virtual world.

According to one embodiment of the present disclosure, a system is provided including a processor and a memory comprising instructions stored thereon, which when executed by the processor, cause the processor to perform a method for controlling movement in a video game. The method includes rotating a camera angle in a virtual world to change a viewpoint of a character. The method also includes populating a movement control interface with selections corresponding to points of interest in the virtual world in response to rotating the camera angle, the selections changing based on the viewpoint. The method also includes selecting a point of interest from the movement control interface by toggling a selection corresponding to the point of interest. The method also includes moving the character to the point of interest in the virtual world.

According to one embodiment of the present disclosure, a non-transitory computer-readable storage medium is provided including instructions (e.g., stored sequences of instructions) that, when executed by a processor, cause the processor to perform a method for controlling movement in a video game. The method includes rotating a camera angle in a virtual world to change a viewpoint of a character. The method also includes populating a movement control interface with selections corresponding to points of interest in the virtual world in response to rotating the camera angle, the selections changing based on the viewpoint. The method also includes selecting a point of interest from the movement control interface by toggling a selection corresponding to the point of interest. The method also includes moving the character to the point of interest in the virtual world.

According to one embodiment of the present disclosure, a system is provided that includes means for storing instructions, and means for executing the stored instructions that, when executed by the means, cause the means to perform a method. The method includes rotating a camera angle in a virtual world to change a viewpoint of a character. The method also includes populating a movement control interface with selections corresponding to points of interest in the virtual world in response to rotating the camera angle, the selections changing based on the viewpoint. The method also includes selecting a point of interest from the movement control interface by toggling a selection corresponding to the point of interest. The method also includes moving the character to the point of interest in the virtual world.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
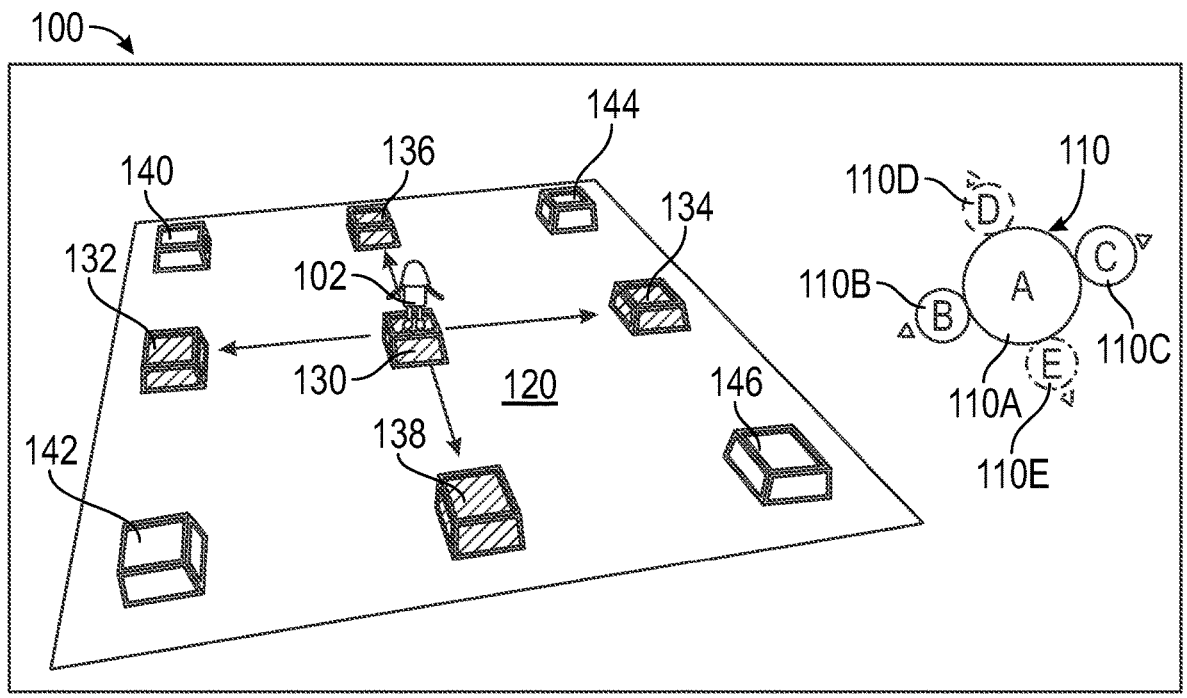
FIG. 1 illustrates an example perspective view of a virtual world and a movement control interface, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Conventional techniques for controlling movement in a video game involve the use of a controller, such as a gamepad, joystick, keyboard and mouse, or virtual controls. First person shooter games typically include separate controls for controlling a camera view and movement of a player. Because a player often actively engages both controls simultaneously with both thumbs, it becomes difficult to perform other tasks involving the player's thumbs. As a result, the player must tradeoff controlling camera view and/or movement for performing other in-game tasks. This affects the player's ability to play the game, and reduces the player's enjoyment of playing the game.

In mobile gaming environments, controls for moving an in-game camera view (e.g., for aiming a gun) and controls for moving a video game character are typically processed through a touchscreen interface. As a result, unlike when playing through a console or computer (e.g., desktop), a player does not have the benefit of tactile feedback relating to the controls. The player must rely on keeping their hands in a similar position in order to receive responsiveness to their intended controls. However, this is difficult, especially when playing a particularly exciting game.

Aspects of the present disclosure address these issues by providing for automatic movement of a video game character to a point of interest. In an implementation, a movement control interface is populated with points of interest based on a camera view of a player. As the player controls the camera view, the movement control interface updates the points of interest. By toggling any point of interest, the video game character automatically travels to that point of interest, thus freeing up the player's hands for other in-game tasks. Another advantage is increased precision in movement controls, especially in a mobile gaming environment.

The disclosed system addresses a problem in traditional game streaming tied to computer technology, namely, the technical problem of multi-tasking while controlling movement of a video game character. The disclosed system solves this technical problem by providing a solution also rooted in computer technology, namely, by providing for automatic movement of a video game character to a point of interest. Because the video game character automatically moves to the point of interest, a player may optimize their gaming experience by strategizing other in-game tasks rather than being preoccupied with controlling the movement of the character.

The disclosed subject technology further provides improvements to the functioning of the computer itself because it reduces processing costs associated with player movement controls. Specifically, a reduction in player input regarding character movement allows for reduced processing costs and frees up processing power for other tasks. As a result, latency in rendering graphics may be reduced.

FIG. 1 illustrates an example output display 100 having a perspective view of a virtual world 120 and a movement control interface 110, according to certain aspects of the disclosure. The output display 100 may be displayed on any video output, including but not limited to, a monitor, a touchscreen display, a television, a smartphone screen, etc.

As a character 102 travels and explores the virtual world 120, different points of interest (e.g., points of interest 132, 134, 136, 138, 140, 142, 144, and 146) will appear or fade from the character's point of view. These points of interest may dynamically populate or depopulate input selections (e.g., input selections 110B, 110C, 110D, and 110E) of the movement control interface 110 as the character 102 navigates through the virtual world 120.

According to an aspect of the present disclosure, a player controlling the character 102 may control movement of the character 102 through the movement control interface 110. For example, the character 102 may be located at a current position 130 that is facing a first point of interest 136. A second point of interest 132 may be to the left of the character 102, a third point of interest 134 may be to the right of the character 102, and a fourth point of interest 138 may be behind the character 102. At the same time, the movement control interface 110 may show that the character is located at point A (e.g., a current location 110A) with input selections 110B-110E available for selection. For example, a first input selection 110D may correspond to the first point of interest 136, a second input selection 110B may correspond to the second point of interest 132, a third input selection 110C may correspond to the third point of interest 134, and a fourth input selection 110E may correspond to the fourth point of interest 138. In an implementation, the player may choose to navigate to any of the first point of interest 136, the second point of interest 132, the third point of interest 134, or the fourth point of interest 138 by toggling the corresponding input selection 110B-110E.

According to an aspect, the player may rotate a camera angle to adjust the character's viewpoint. For example, as the player rotates the camera angle to the left, the points of interest 132-138 may accordingly rotate clockwise on the movement control interface 110. As a result, the input selections 110B-110E may dynamically update (e.g., in real-time) according to the changing camera angle. In an implementation, input selections may appear or disappear from the movement control interface 110 as the player rotates the camera and causes the character 102 to traverse the virtual world 120. For example, when the character's viewpoint rotates to face a fifth point of interest 140, a new input selection corresponding to the fifth point of interest 140 may appear on the movement control interface 110. Similarly, when the character 102 is facing and/or is proximate to a sixth point of interest 142, a seventh point of interest 144, or an eighth point of interest 146, the movement control interface 110 may be updated with a new input selection corresponding to the appropriate point of interest 142-146. In an implementation, some of the input selections 110B-110E may disappear from the movement control interface 110 if the character is not facing and/or no longer proximate to the corresponding point of interest (e.g., the character 102 has traveled away).

In an implementation, some of the points of interest may not be available for selection through the movement control interface 110 until the character 102 is facing and/or within a certain distance from the point of interest. For example, points of interest 140-146 may only be available for selection when the character 102 is facing and/or within a certain distance from the point of interest, and points of interest 132-138 may be available for selection as long as the character 102 is proximate to them. It is understood that as the character 102 traverses the virtual world 120, additional points of interest will appear for selection through the movement control interface 110.

Figure 2:
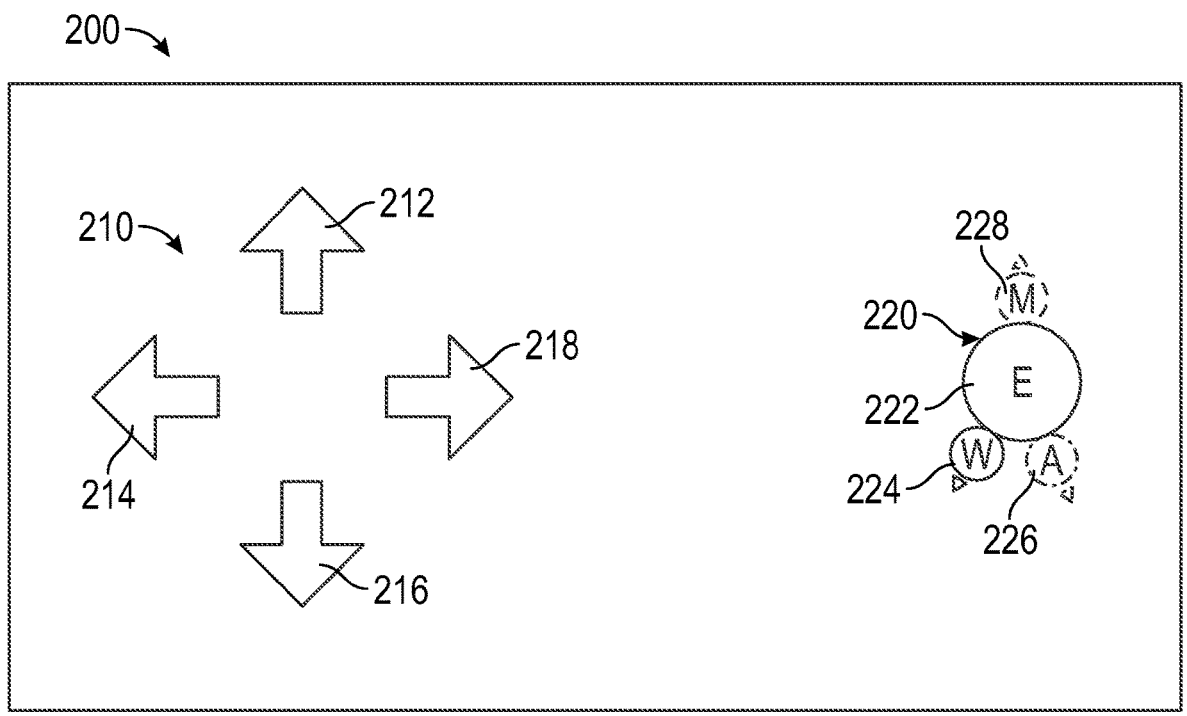
FIG. 2 illustrates an example user control interface, according to certain aspects of the disclosure.

FIG. 2 illustrates an example user control interface 200 including a viewpoint control 210 and a movement control interface 220, according to certain aspects of the disclosure. A player may utilize the viewpoint control 210 to rotate a camera angle that changes a viewpoint of an in-game character (e.g., character 102 of FIG. 1). The viewpoint control 210 may include directional controls, such as an up control 212, a left control 214, a down control 216, and a right control 218. It is understood that the viewpoint control 210 may either be explicitly displayed to the player such that the player may toggle each of the directional controls directly, or may be hidden from the player such that the player intuitively toggles the directional controls. It is understood that the player may toggle the viewpoint control 210 through various methods, including but not limited to, through touch, mouse click, keyboard selection, gamepad input, joystick, etc.

As the player rotates the camera angle with the viewpoint control 210, the movement control interface 220 may automatically populate or depopulate with points of interest. The points of interest may be displayed on the movement control interface 220 based on their locations relative to the character. For example, input selection M 228 indicates that a point of interest M is in front of the character, and input selection W 224 and input selection A 226 indicate that point of interest W and point of interest A are behind the character. By toggling any of these input selections 224-228, the character will travel from current point E 222 to the corresponding point of interest. In an implementation, the character may instantaneously jump to the selected point of interest. The character may also travel to the point of interest by walking, running, on a vehicle, through a mount, flying, etc. In this way, the player's hands are freed from having to control movement of the character and the player may strategize their gameplay by performing additional tasks and actions while traveling.

According to an aspect of the present disclosure, the movement control interface 220 may be displayed to the player in various ways. For example, the movement control interface 220 may include icons instead of letters for the input selections 224-228. The input selections 224-228 may also be color-coded based on a context of the corresponding point of interest. For example input selection M 228 may be color-coded red for an enemy base, input selection A 226 may be color-coded blue for a home base, and input selection W 224 may be color-coded grey for location of a flag. It is understood that in addition to the above-described features, the input selections 224-228 may be color-coded for various reasons with various colors.

According to an aspect, the movement control interface 220 may display information relating to distance to a goal, distance to an objective, location of an adjacent enemy, location of cover, location of a trophy, location of a boss, etc. It is understood that other information may also be displayed.

According to additional aspects, the movement control interface 220 may be layered such that each layer may include different categories of information. For example, the layers may include information regarding a current objective, information regarding enemies, information regarding trophies, etc. In an implementation, the player may cycle through the layers such that different points of interest may appear that otherwise would not appear on the movement control interface. According to an aspect, some input selections may appear greyed out if the corresponding point of interest is out of range, not within view, are un-traversable, etc. For example, as illustrated, input selection A 226 and input selection M 228 are shown in dotted lines because they are not selectable and input selection W 224 is shown in solid lines because it is selectable.

Figure 3:
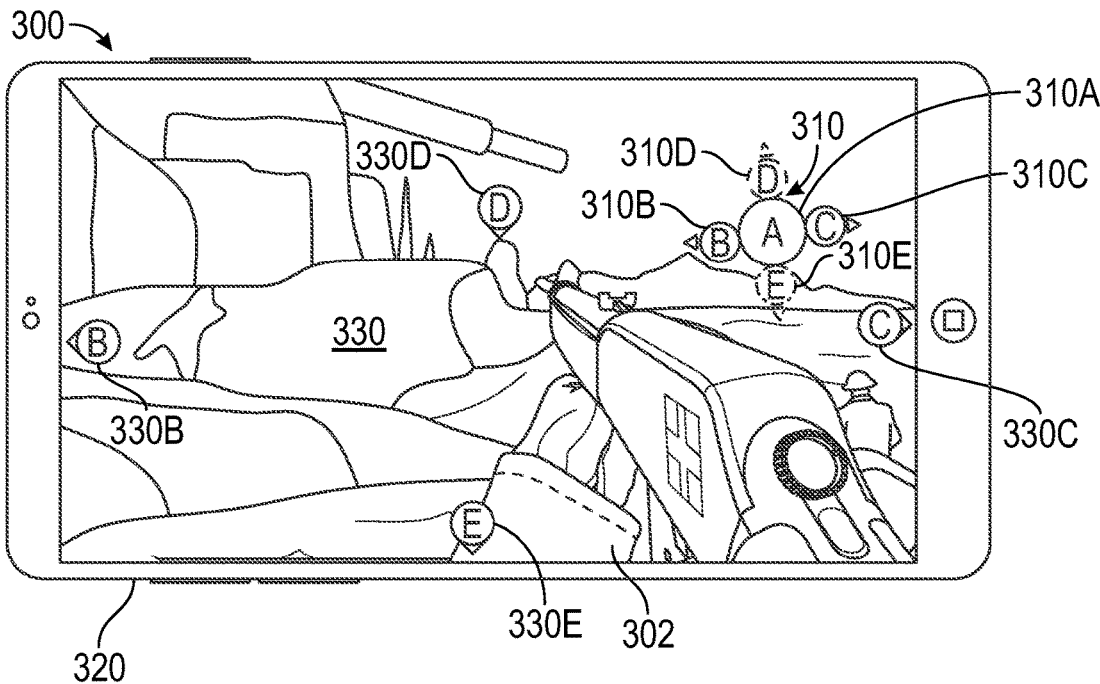
FIG. 3 illustrates an example first person point of view of a virtual world and a movement control interface, according to certain aspects of the disclosure.

FIG. 3 illustrates an example output display 300 having a first person point of view of a virtual world 330 and a movement control interface 310, according to certain aspects of the disclosure. For example, the output display 300 may be for a first person shooter video game. It is understood that the description herein applies to other types of video games as well, and is not limited to first person shooters.

As illustrated, movement of an in-game character 302 may be controlled by a player through the movement control interface 310. For example, a viewpoint control (e.g., viewpoint control 210 of FIG. 2) may control a camera angle of the character 302 for aiming (e.g., free aim) and determining a direction of movement. The video game may also include an auto-trigger function such that the character 302 automatically shoots at enemies. The viewpoint control is not displayed to the player, but in other implementations the viewpoint control may be displayed. According to an implementation, the movement control interface 310 may display a current location 310A and may include input selections 310B-310E (e.g., a first input selection 310D, a second input selection 310B, a third input selection 310C, a fourth input selection 310E) corresponding to points of interest 330B-330E (e.g., a first point of interest 330D, a second point of interest 330B, a third point of interest 330C, a fourth point of interest 330E) in the virtual world 330. As illustrated, each of the points of interest 330B-330E may be visually flagged to the player in the virtual world.

The output display 300 may be displayed on a display 320. For example, the display 320 may be a touchscreen device (e.g., a smartphone, table PC, touchscreen computer, etc.), a monitor, a TV, etc., depending on how the player is playing the game. According to aspects of the present disclosure, the game may be a mobile game played through a smartphone or a handheld console. The game may also be played through a desktop computer, laptop computer, console, etc. In an implementation, the movement control interface 310 may be toggled in various ways. For example, the player may physically toggle the movement control interface 310 through a touchscreen, click on the input selections 310B-310E with a mouse, select a letter corresponding to the input selections 310B-310E with a keyboard, input a letter corresponding to the input selections 310B-310E with a gamepad, and/or utilize a joystick to select an input selection 310B-310E based on a direction of the joystick (e.g., UP for input selection 310D, DOWN for input selection 310E, etc.). The player may also control movement by directly toggling the flags corresponding to the points of interest 330B-330E. It is understood that various other methods of toggling the movement control interface 310 may be utilized.

According to an aspect, the movement control interface 310 may be configured to be displayed either on the left or the right of the display 320 to accommodate a player who is either left-handed or right-handed. For example, the movement control interface 310 may be displayed on the right of the display 320 (as illustrated in FIG. 3) for a right-handed player, or on the left of the display 320 for a left-handed player.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
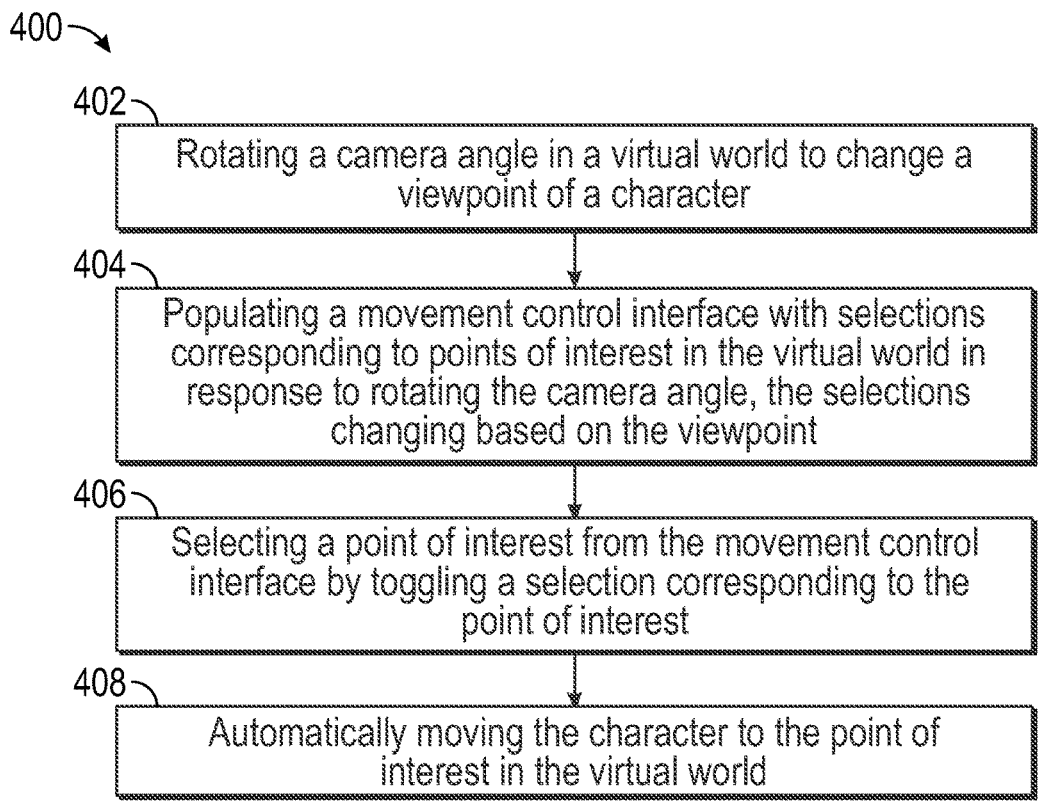
FIG. 4 illustrates an example flow diagram for controlling movement in a video game, according to certain aspects of the disclosure.

FIG. 4 illustrates an example flow diagram (e.g., process 400) for controlling movement in a video game, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple steps of the example process 400 may occur in parallel. In addition, the steps of the example process 400 need not be performed in the order shown and/or one or more of the steps of the example process 400 need not be performed. For purposes of explanation of the subject technology, the process 400 will be discussed in reference to FIGS. 1-3.

At step 402, a camera angle is rotated in a virtual world to change a viewpoint of a character. At step 404, a movement control interface is populated with selections corresponding to points of interest in the virtual world in response to rotating the camera angle, the selections changing based on the viewpoint. At step 406, a point of interest is selected from the movement control interface by toggling a selection corresponding to the point of interest. At step 408, the character automatically moves to the point of interest in the virtual world.

For example, as described above in relation to FIGS. 1-3, at step 402 a player may utilize a viewpoint control 210 to rotate a camera angle to change a viewpoint of a character 102, 302 in a virtual world 120, 330. At step 404, a movement control interface 110, 220, 310 may be populated with input selections 110B-110E, 224-228, 310B-310E that correspond to points of interest 132-146, 330B-330D. At step 406, one of the points of interest 132-146, 330B-330D is selected from the movement control interface 110, 220, 310 by toggling an input selection 110B-110E, 224-228, 310B-310E corresponding to the point of interest 132-146, 330B-330D. At step 408, the character 102, 302 automatically moves to the point of interest 132-146, 330B-330D in the virtual world 120, 330.

According to an aspect, the process 400 further includes changing sizes of selections based on distances away from a current location in the virtual world. For example, as described in FIGS. 1-3, sizes of the input selections 110B-110E, 224-228, 310B-310E may be based on a distance away from a current location 110A, 222, 310A in the virtual world 120, 330. In an implementation, the farther away the point of interest 132-146, 330B-330D, the smaller the corresponding input selection 110B-110E, 224-228, 310B-310E.

According to an aspect, the process 400 further includes graying out selections that are outside of a traversal area on the movement control interface. For example, as described in FIGS. 1-3, the input selections 110B-110E, 224-228, 310B-310E may be grayed out if they are outside of a traversal area on the movement control interface 110, 220, 310.

According to an aspect, the process 400 further includes displaying selections as icons and/or letters on the movement control interface. For example, as described in FIGS. 1-3, the input selections 110B-110E, 224-228, 310B-310E may be displayed as icons or letters on the movement control interface 110, 220, 310.

According to an aspect, the process 400 further includes dynamically generating the selections corresponding to points of interest in the virtual world around the player. The process 400 may include generating a first selection corresponding to a first point of interest in front of a player, generating a second selection corresponding to a second point of interest behind the player, generating a third selection corresponding to a third point of interest left of the player, and generating a fourth selection corresponding to a fourth point of interest right of the player. For example, as described in FIGS. 1-3, a first input selection 110D, 310D may correspond to a first point of interest 136, 330D, a second input selection 110B, 310B may correspond to a second point of interest 132, 330B, a third input selection 110C, 310C may correspond to a third point of interest 134, 330C, and a fourth input selection 110E, 310E may correspond to a fourth point of interest 138, 330E.

According to an aspect, the process 400 further includes including, in the movement control interface, information regarding at least one of a distance to a goal, an objective, a current location, and/or an indicator. For example, as described in FIGS. 1-3, the movement control interface 110, 220, 310 may including information such as distance to a goal, an objective, a current location, and/or an indicator.

According to an aspect, the movement control interface comprises different control interfaces for different goals. For example, as described in FIGS. 1-3, the movement control interface 110, 220, 310 may include different layers corresponding to different in-game goals.

Hardware Overview

Figure 5:
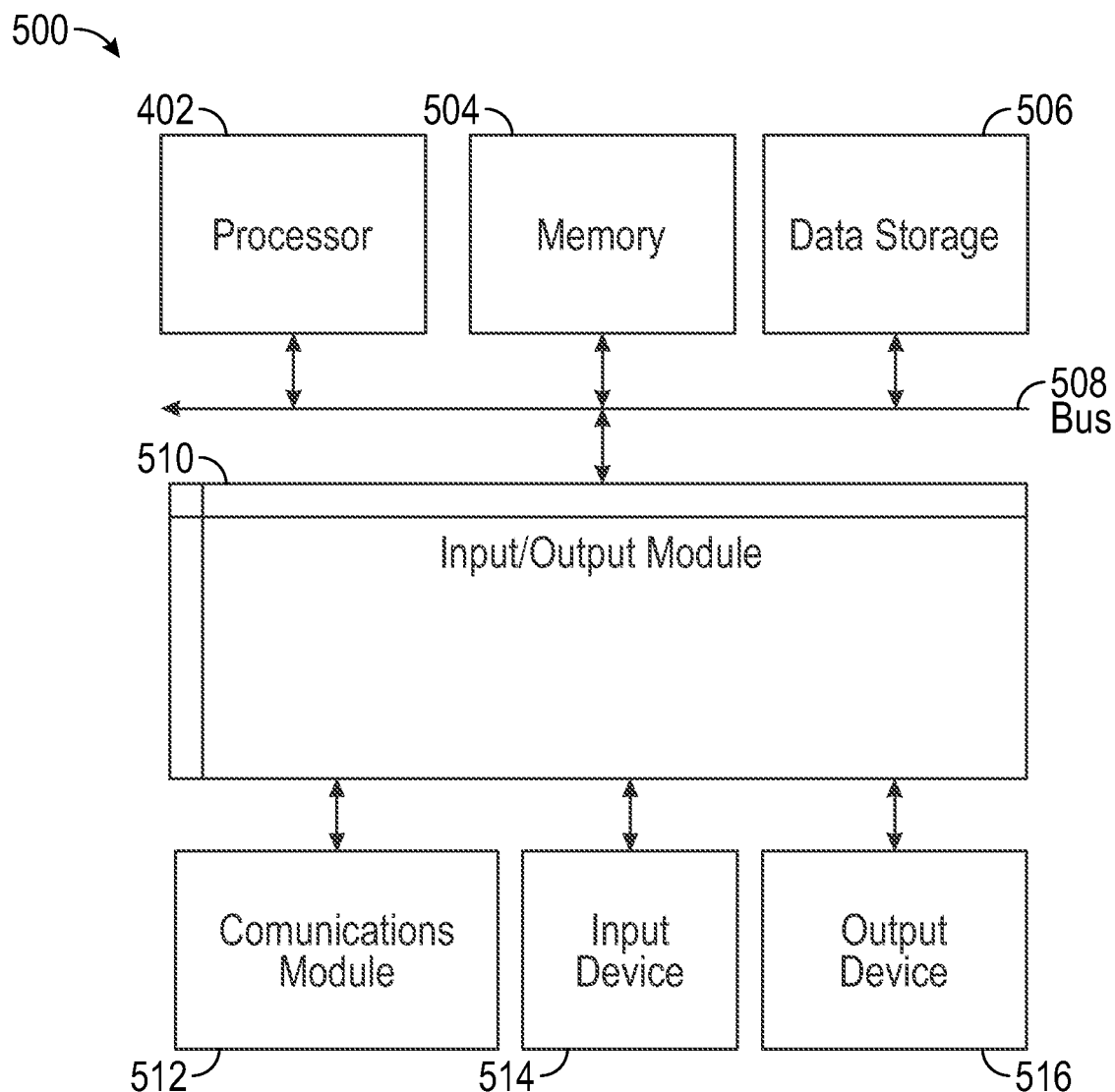
FIG. 5 is a block diagram illustrating an example computer system with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., a gaming console, smartphone, desktop computer, tablet, laptop, etc.) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as a LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for controlling movement in a video game, comprising:
   populating a movement control interface with selections corresponding to points of interest in a virtual world, the movement control interface comprising layers for displaying different categories of information on each layer, the categories of information comprising at least one of a current objective, enemy locations, or trophy locations;
   cycling through the layers to populate the movement control interface with selections corresponding to the categories of information;
   rotating a camera angle in the virtual world to change a viewpoint of a character;
   re-populating the movement control interface with selections corresponding to points of interest in the virtual world in response to rotating the camera angle, the selections changing based on the viewpoint;
   selecting a point of interest from the movement control interface by toggling a selection corresponding to the point of interest; and
   moving the character to the point of interest in the virtual world.

2. The computer-implemented method of claim 1, further comprising:
   changing sizes of selections based on distances away from a current location in the virtual world.

3. The computer-implemented method of claim 1, further comprising:
   graying out selections that are outside of a traversal area on the movement control interface.

4. The computer-implemented method of claim 1, further comprising:
   displaying selections as icons and/or letters on the movement control interface.

5. The computer-implemented method of claim 1, further comprising:
   dynamically generating the selections corresponding to points of interest in the virtual world around the player.

6. The computer-implemented method of claim 1, further comprising:
including, in the movement control interface, information regarding at least one of a distance to a goal, an objective, a current location, and/or an indicator.

7. The computer-implemented method of claim 1, wherein the movement control interface comprises different control interfaces for different goals.

8. A system for controlling movement in a video game, comprising:
a processor; and
a memory comprising instructions stored thereon, which when executed by the processor, causes the processor to perform:
populating a movement control interface with selections corresponding to points of interest in a virtual world, the movement control interface comprising layers for displaying different categories of information, the categories of information comprising at least one of a current objective, enemy locations, or trophy locations;
cycling through the layers to populate the movement control interface with selections corresponding to the categories of information;
rotating a camera angle in the virtual world to change a viewpoint of a character;
re-populating the movement control interface with selections corresponding to points of interest in the virtual world in response to rotating the camera angle, the selections changing based on the viewpoint;
selecting a point of interest from the movement control interface by toggling a selection corresponding to the point of interest; and
moving the character to the point of interest in the virtual world.

9. The system of claim 8, further comprising stored sequences of instructions, which when executed by the processor, cause the processor to perform:
changing sizes of selections based on distances away from a current location in the virtual world.

10. The system of claim 8, further comprising stored sequences of instructions, which when executed by the processor, cause the processor to perform:
graying out selections that are outside of a traversal area on the movement control interface.

11. The system of claim 8, further comprising stored sequences of instructions, which when executed by the processor, cause the processor to perform:
displaying selections as icons and/or letters on the movement control interface.

12. The system of claim 8, further comprising stored sequences of instructions, which when executed by the processor, cause the processor to perform:
dynamically generating the selections corresponding to points of interest in the virtual world around the player.

13. The system of claim 8, further comprising stored sequences of instructions, which when executed by the processor, cause the processor to perform:
including, in the movement control interface, information regarding at least one of a distance to a goal, an objective, a current location, and/or an indicator.

14. The system of claim 8, wherein the movement control interface comprises different control interfaces for different goals.

15. A non-transitory computer-readable storage medium is provided including instructions that, when executed by a processor, cause the processor to perform a method for controlling movement in a video game, comprising:
populating a movement control interface with selections corresponding to points of interest in a virtual world, the movement control interface comprising layers for displaying different categories of information, the categories of information comprising at least one of a current objective, enemy locations, or trophy locations;
cycling through the layers to populate the movement control interface with selections corresponding to the categories of information;
rotating a camera angle in the virtual world to change a viewpoint of a character;
re-populating the movement control interface with selections corresponding to points of interest in the virtual world in response to rotating the camera angle, the selections changing based on the viewpoint;
selecting a point of interest from the movement control interface by toggling a selection corresponding to the point of interest; and
moving the character to the point of interest in the virtual world based on the selection.

16. The non-transitory computer-readable storage medium of claim 15, wherein the method further comprises:
changing sizes of selections based on distances away from a current location in the virtual world.

17. The non-transitory computer-readable storage medium of claim 15, wherein the method further comprises:
graying out selections that are outside of a traversal area on the movement control interface.

18. The non-transitory computer-readable storage medium of claim 15, wherein the method further comprises:
displaying selections as icons and/or letters on the movement control interface.

19. The non-transitory computer-readable storage medium of claim 15, wherein the method further comprises:
dynamically generating the selections corresponding to points of interest in the virtual world around the player.

20. The non-transitory computer-readable storage medium of claim 15, wherein the method further comprises:
including, in the movement control interface, information regarding at least one of a distance to a goal, an objective, a current location, and/or an indicator.

* * * * *